Oct. 10, 1939.    F. R. STAMP    2,175,324
POPSICLE FREEZING DEVICE
Filed July 18, 1938    3 Sheets-Sheet 1

Inventor
Floyd R. Stamp
Albert E. Dieterich
By   and
Theodore H. Rutley
Attorneys Oct. 10, 1939.  F. R. STAMP  2,175,324
POPSICLE FREEZING DEVICE
Filed July 18, 1938  3 Sheets-Sheet 2
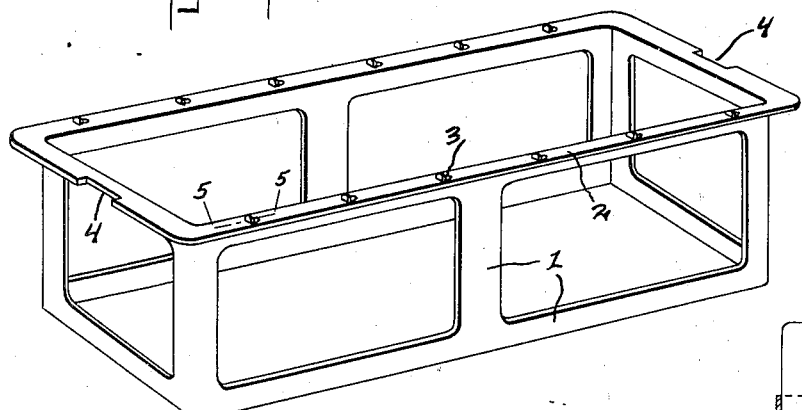
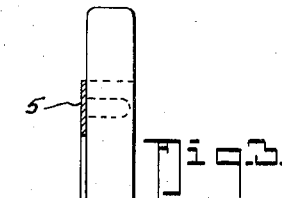
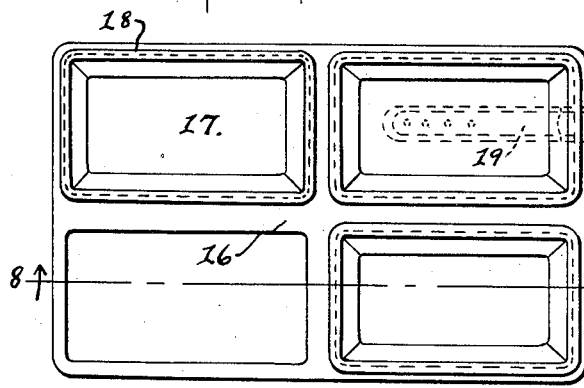
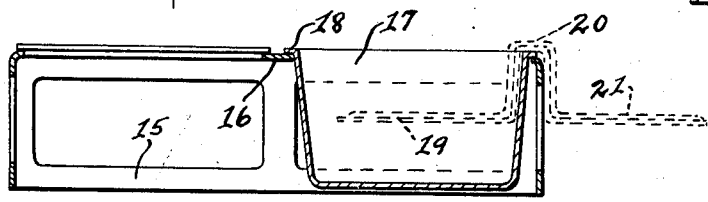
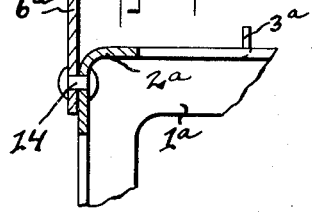
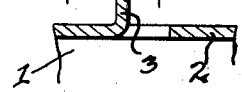
Inventor
Floyd R. Stamp
Albert E. Dieterich
and
Theodore H. Rutley
Attorneys

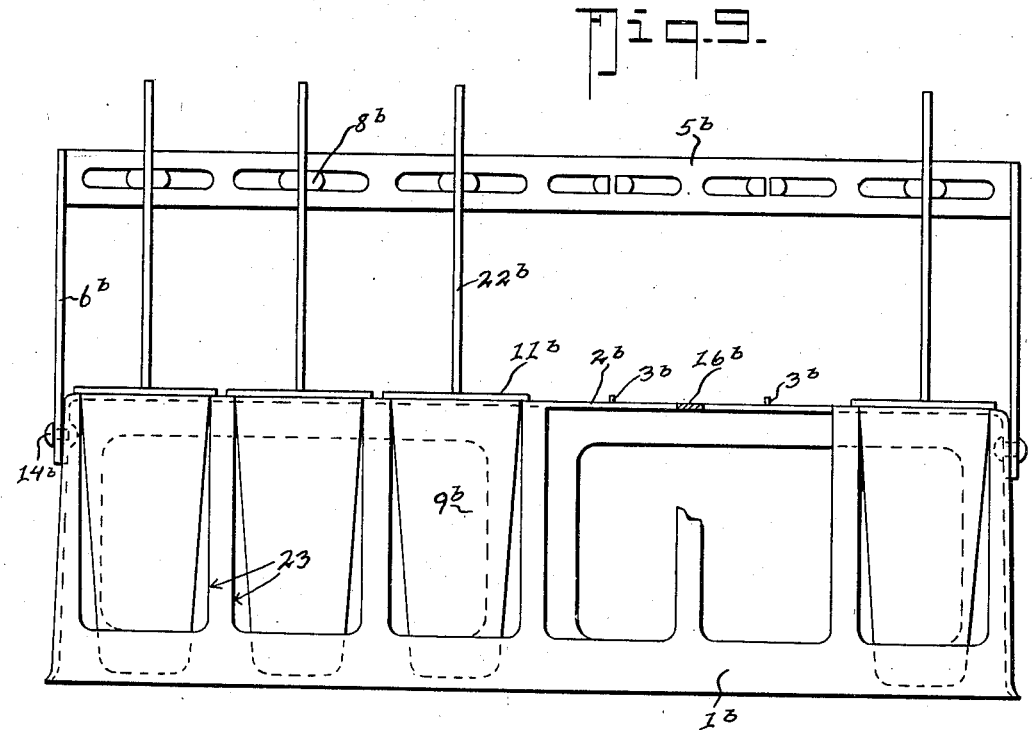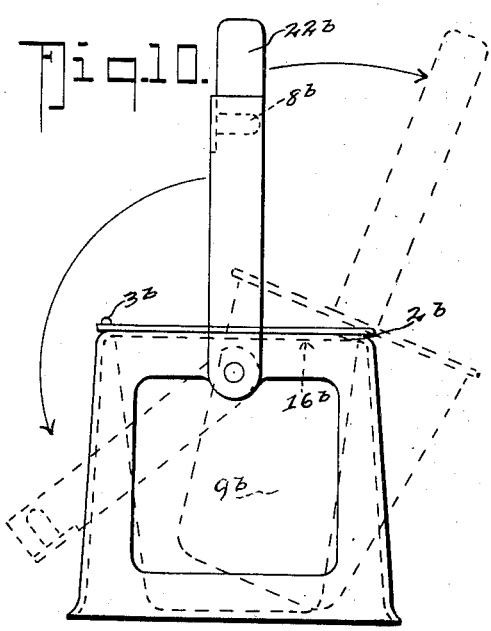

Patented Oct. 10, 1939

2,175,324

UNITED STATES PATENT OFFICE 2,175,324

POPSICLE FREEZING DEVICE

Floyd R. Stamp, Wabash, Ind.

Application July 18, 1938, Serial No. 219,887

7 Claims. (Cl. 107—19)

My invention relates to certain new and useful improvements in devices for insertion in the chillers of domestic refrigerators and others for the purpose of freezing frozen confections on sticks and it particularly seeks to provide a holder with a plurality of individual trays any one or more of which can be removed and replaced at will.

A further object of the invention is to provide a device which will permit of free circulation of chilled air about the trays to ensure rapid freezing.

Again, it is an object to provide a skeleton frame for supporting the trays, to which frame a suitable support whereby the sticks to which the confection is to be frozen are held in proper positions with respect to the trays and from which the sticks may separately be detached and replaced at will.

Again, it is an object to provide a tray-supporting frame in which the trays are suspended by flanges on the tray resting on flanges on the frame, with provision for locating each individual tray in a definite place in the frame to ensure proper alignment between the sticks and the trays.

Other objects will in part be obvious and in part be pointed out hereinafter.

To the attainment of the aforesaid objects and ends the invention still further resides in the novel details of construction, combination and arrangement of parts, all of which will be first fully described in the following detailed description, and then be particularly pointed out in the appended claims, reference being had to the accompanying drawings, in which:

Fig. 3 is a vertical cross section on the line 3—3 of Fig. 1.

Fig. 4 is a detail perspective view of the tray-supporting frame.

Fig. 5 is a detail section on the line 5—5 of Fig. 4.

Fig. 6 is a detail vertical section showing a slight modification of the invention.

Fig. 7 is a plan view of another form of the invention.

Fig. 8 is a vertical section on the line 8—8 of Fig. 7.

Fig. 9 is a side elevation of a modification of the invention hereinafter referred to.

Fig. 10 is an end elevation of the structure shown in Fig. 9.

Figure 1:
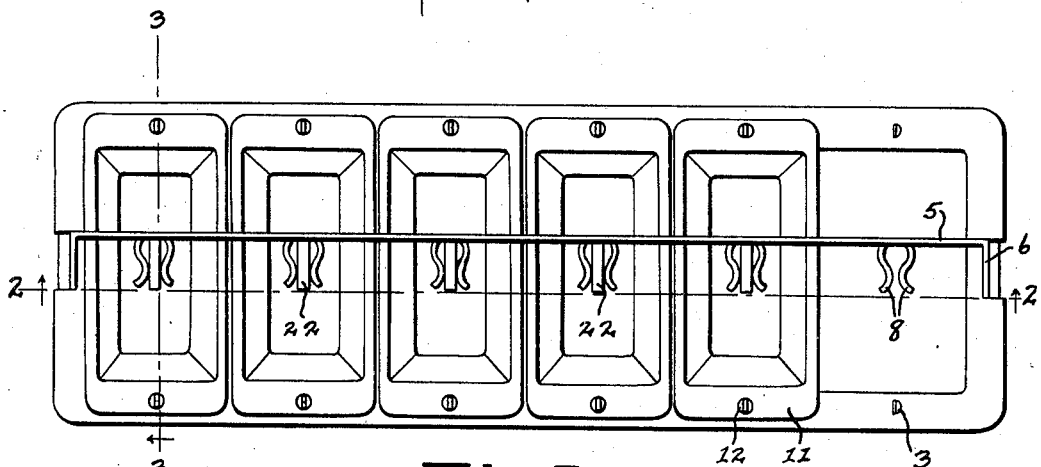
Fig. 1 is a top plan view of the preferred embodiment of the invention, one tray being omitted.

In the drawings, in which like numbers and letters of reference designate like parts in all the figures, 1 is a skeleton frame having a top flange 2 with stamped-out, suitably spaced lugs 3 and recesses 4 in the end flanges.

Each of the molds comprises, preferably, a somewhat tapered body 9 having a top flange 10 to rest on flange 2 and having holes 12 in its end flanges 11 to fit over the lugs 3 (see Fig. 1). Preferably, the molds have their flanges spaced slightly apart to allow air circulation.

Figure 2:
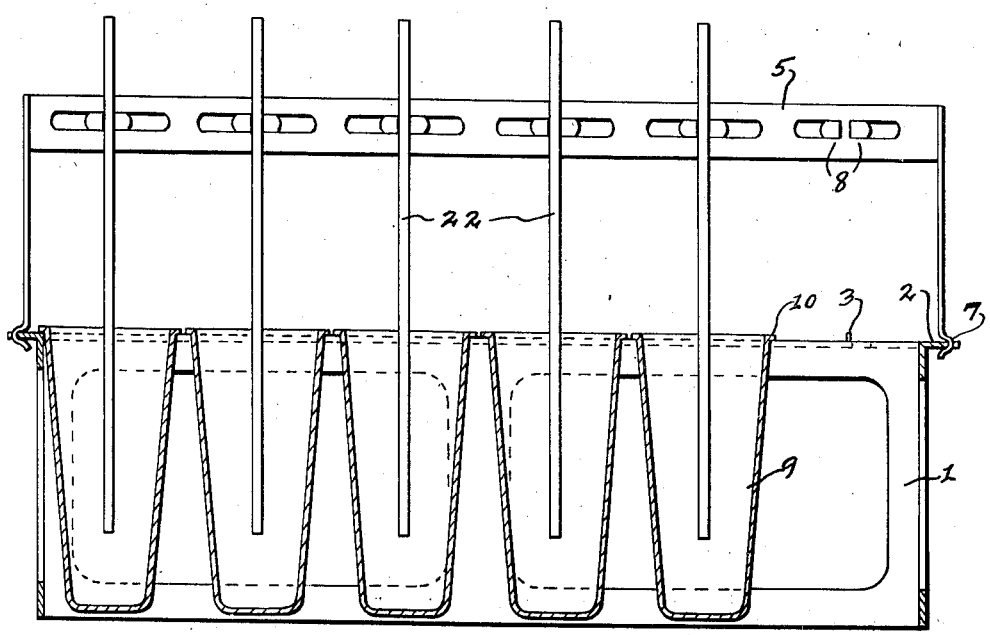
Fig. 2 is a vertical longitudinal section on the line 2—2 of Fig. 1.

The sticks 22 are held by spring clip 8, stamped from a bridge member 5 having uprights 6 at its ends, which uprights have clips 7 to fit over the flanges of the frame 1 and lie in the recesses 4 (see Fig. 2).

As a modified for, the bridge may have its uprights $6^a$ riveted at 14 to the wall of the frame $1^a$ so that the bridge can be turned on the rivets 14 as an axis to fold over against the side of the frame when desired.

In Figs. 7 and 8 I have shown the application of the invention to another form of tray. In these figures 15 is the frame having a skeleton top 16 to provide flanges on which the molds 17 hang in the frame spaces by their flanges 18. Sticks, each of which comprises a portion 19 to receive the frozen confection, a portion 20 to fit over the edge of the mold and frame, and a handle portion 21, are used.

In Fig. 9 I have shown a modification in which the front of the skeleton frame $1^b$ is cut away as at 23 to provide side openings through which the molds may be rocked, as shown in dotted lines in Fig. 10, to facilitate their easy removal when it is desired to remove one or more molds at a time. In this form the cross bars $16^b$ serve as spacers between the several mold units. Lugs $3^b$ may be used on the closed side (the side opposite that side shown in Fig. 9), if desired, or they may be entirely omitted in this form of the invention.

In Figs. 9 and 10 those parts which bear the same reference numerals, plus the index letter $b$, correspond in structure and function to the parts correspondingly numbered in the preceding figures, and a detailed description of Figs. 9 and 10 is therefore thought to be unnecessary.

In practice the sticks are located and held in proper position and the molds or trays supplied with the required liquid, the molds, of course, being in place in the frame.

The frame, with the molds and sticks, is then placed in the chiller of a refrigerator until the liquid contents of the molds become frozen. When desired, one or more of the molds with the contents of the same may be removed and refilled without disturbing the remainder, as will be obvious upon inspection of the drawings.

From the foregoing description, taken in connection with the accompanying drawings, it is thought that the construction, operation and advantages of the invention will be clear to those skilled in the art to which it relates.

What I claim is:

1. As a means to freeze confections, a skeleton supporting frame having a top flange to suspend a plurality of individual molds having top flanges within said frame, and means to support a stick for each mold in position in the mold, said means comprising a bridge carried by said frame over the molds and stick holding elements on said bridge, said bridge including arms pivoted to the frame.

2. As a means to freeze confections, a skeleton supporting frame having a top flange to suspend a plurality of individual molds having top flanges within said frame, and means to support a stick for each mold in position in the mold, said means comprising a bridge carried by said frame over the molds and stick-holding elements on said bridge, said bridge including arms removably held on the frame.

3. As a means to freeze confections, a skeleton frame having top flanges, a plurality of individual molds having top flanges and suspended in said frame by said top flanges, said frame having slots in its front wall through which said molds may be tilted for purposes of removal, and means to support a stick for each mold in position in the mold.

4. As a means to freeze confections, a skeleton frame having top flanges, a plurality of individual molds having top flanges and suspended in said frame by said top flanges, said frame having slots in its front wall through which said molds may be tilted for purposes of removal, and means to support a stick for each mold in position in the mold, said means comprising a bridge having a clip for holding each stick and having arms pivotally connected to said frame by virtue of which said bridge may be swung over to one side of the frame clear of the top thereof.

5. A means for supporting individual molds and sticks of the character described, comprising a skeleton frame having a top flange and adapted to support the molds suspended from the flange within the confines of the frame, and a stick holding bridge comprising a top bar with stick holding elements and side arms, and means to mount said side arms on the ends of said frame.

6. A means for supporting individual molds and sticks of the character described, comprising a skeleton frame having a top flange and adapted to support the molds suspended from the flange within the confines of the frame, and a stick holding bridge comprising a top bar with stick holding elements and side arms, and means to mount said side arms on the ends of said frame, said frame having slots in its top flange at one side at least through which the molds may be tilted and said arms being pivotally mounted on the ends of the frame whereby when the mold contents have been solidified on the sticks the bridge may be rocked to tilt the molds out of the frame.

7. In a popsicle freezing device, a skeleton supporting frame having a top marginal flange, a plurality of individual molds having top flanges to rest on the top marginal flange of the frame, the mold flanges having apertures, pins carried by said marginal flange to enter said apertures and hold the molds in position, said marginal flange having portions removed in line with each mold, by virtue of which the molds may be tilted in the frame and removed and inserted both vertically and sideways as desired.

FLOYD R. STAMP.